Nov. 5, 1968 D. HEYER 3,409,813
MOTOR OPERATED ADJUSTOR MECHANISM UTILIZING PLURAL
MOTORS AND CLUTCH MEANS
Filed April 27, 1965
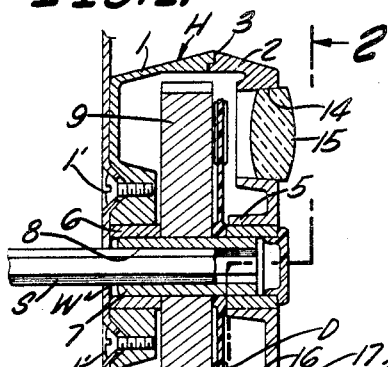
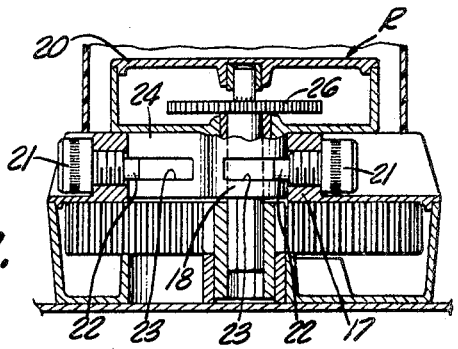
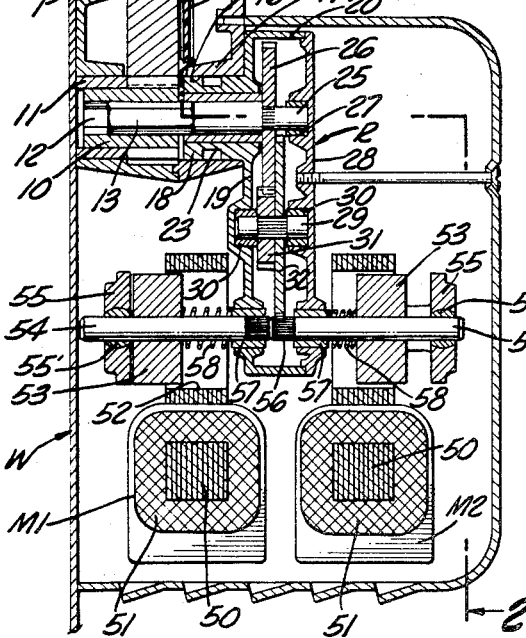
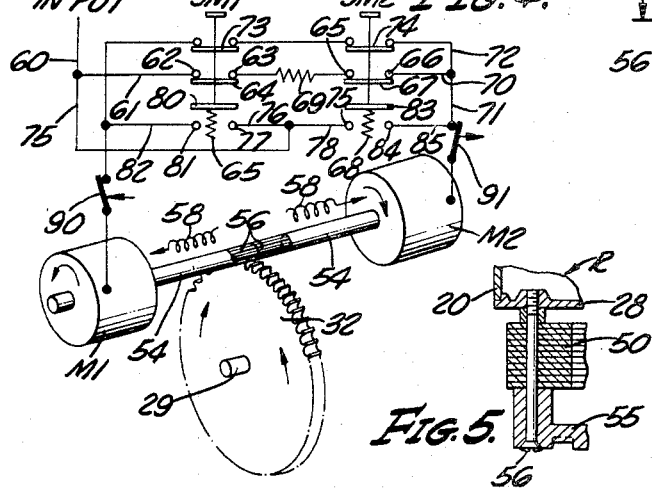
INVENTOR
DON HEYER
BY
Paul A. Weilein
ATTORNEY

United States Patent Office 3,409,813
Patented Nov. 5, 1968

3,409,813
MOTOR OPERATED ADJUSTOR MECHANISM UTILIZING PLURAL MOTORS AND CLUTCH MEANS
Don Heyer, 1019 N. Raymond Ave., Fullerton, Calif., 92631
Filed Apr. 27, 1965, Ser. No. 451,146
16 Claims. (Cl. 318—8)

ABSTRACT OF THE DISCLOSURE

Motor operated adjustor mechanism for selectively effecting rotation of an adjustor member in opposite directions by means of two unidirectional motors having their shafts axially aligned and being reciprocable towards each other in response to shifting movement of the motor rotors when the motors are energized to bring clutch means thereon into driving engagement with a common gear, and reciprocable away from each other under urging springs to disengage the clutch means. The control is arranged to selectively energize the motors for effecting the desired direction of rotation of the adjustor member, and for energizing both motors so as to be drivingly clutched to the gear, but due to their tendency to rotate the gear in opposite directions will lock and hold the gear against retrograde movement from an adjusted position of the adjustor member. Indicating means are drivingly coupled with the gear for indicating the extent of adjustment.

---

The present invention relates to motor operated mechanism and more particularly to motor operated adjustor mechanism wherein it is desirable to effect selective opposite rotation of an adjustor element such as an adjustor shaft.

In the adjustment of certain mechanisms, for example, the input to output drive ratio of variable pulley belt drives or variable drive mechanisms, an adjustor member is adapted to be rotated in opposite directions to effect the desired change in the drive ratio. An example of a variable pulley belt drive including such an adjustor member is disclosed in my pending application Serial No. 366,350, filed May 11, 1964, now Pat. No. 3,374,106 to which particular reference may be made for an illustration of a manually operable adjustor mechanism.

The present invention contemplates an adjustor mechanism operating means comprising a pair of motors which will effect omnidirectional adjustment of the adjustor shaft of the variable speed drive disclosed in the pending application just identified above. It will be recognized, however, that the motor operated mechanism hereof has other applications wherein such operation of an adjustor or other member is desired.

An object of the present invention is to provide a motor operated mechanism wherein a simple form of electric motor is employed as the means for effecting rotation of the adjustor member in one direction, and in order to effect rotation of the adjustor member in the other direction a second simple electric motor is employed, the electric motors being of the unidirectionally rotating type and having their rotor shafts disposed in axial alignment and selectively engageable with a member to be driven and rotatably adjusted in one direction or the other, depending upon which motor shaft is caused to engage the member to be adjusted.

Another object is to provide a motor operated mechanism in accordance with the preceding object wherein a control circuit is employed which will cause both of the unidirectionally rotatable motor shafts to be held in engagement with the member to be adjusted following the desired adjustment of said member so that the adjustment will be maintained.

Still another object is to provide a simple assemblage of adjustor mechanism and drive motor means therefor which are capable of being correlated in a variety of fashions so as to render the assembly adaptable to a mechanism such as a variable speed pully belt drive in a wide range of relationships.

Still another object of the invention is to provide adjustor mechanism comprising a support for a member to be adjusted in opposite directions and a pair of similar unidirectionally rotatable motors arranged in opposing or reverse relationship, each of the motors having a rotor and rotor shaft reciprocable between a retracted position when the motor is de-energized to an operating position when the motor is energized and the member to be adjusted being selectively engageable by either of the rotor shafts when either of the motors is energized.

Another object is to provide a simple assembly of motor operated adjustor means and indicator means which is indicative of the extent and sense of adjustment accomplished by the adjustor means.

Other objects and advantages of the invention will be hereinafter described or will become apparent to those skilled in the art, and the novel features of the invention will be defined in the appended claims.

In the accompanying drawing:

FIG. 1 is a vertical sectional view through an adjustor and indicator mechanism made in accordance with the invention;

FIG. 2 is a view partly in section and partly in elevation as taken on the line 2—2 of FIG. 1;

FIG. 3 is a fragmentary horizontal transverse sectional view as taken on the line 3—3 of FIG 2;

FIG. 4 is a diagrammatic view showing the relationship between the adjustor motors and the control circuit therefor; and FIG. 5 is a fragmentary detail view in section as taken on the line 5—5 of FIG. 2.

Like reference characters in the several views of the drawing and in the following description designate corresponding parts.

Referring to FIG. 1 the mechanism of the invention is illustrated as being applied to a wall W which may be, for example, a wall of a variable pulley belt drive of the type disclosed in my above identified pending application, or the wall W may be any other suitable support through which extends a shaft S which is to be omnidirectionally adjusted to effect the desired variation in the operation of the variable pulley belt drive or other device controlled by the adjustor shaft S. In the illustrative embodiment the adjustor shaft S extends through an opening W' in the wall W and into a housing H of a mechanism adapted to effect such rotation of the shaft S.

The housing H is composed of complemental body sections 1 and 2 joined as at 3 and secured in abutting relation as by means of fasteners 4 (see FIG. 2). Housing part 1 is secured to wall W by suitable fastenings as at 1'.

The housing parts 1 and 2 are internally provided with bushings 5 and 6 disposed in axially spaced relation and adapted to rotatably mount a support sleeve 7 having a polygonal opening 8 into which the shaft S extends, the latter being correspondingly polygonal in cross section to effect a drive connection with the sleeve 7. Mounted upon the sleeve 7 so as to effect rotation of the latter is a gear 9 which is meshed with a pinion 10, the latter being supported within a bushing 11 carried by the housing section 1 and having a polygonal opening 12 for the reception of a correspondingly polyonal drive shaft 13. Drive shaft 13 is adapted to be driven by a reduction gear mechanism generally denoted at R which will be hereinafter described in greater detail.

Mounted upon the sleeve 7 for rotation therewith along with the gear 9 is an indicator dial generally denoted at D and which bears indicia indicative of adjusted angular relationships of the shaft S relative to some reference point. For example, the indicia may visually indicate a selected input to output drive ratio of the variable pulley belt drive of my above identified pending application for patent. Preferably, the dial D is provided with opposite sets of indicia, for example, sets of numbers ranging between 1 and 9, so that one of the sets of indicia would be employed as indicative of an adjusted position of shaft S when the dial D is operatively connected with one end of the shaft S, and the other set of indicia would be viewed as indicative of the angular adjustment of the shaft S when the dial D is operatively connected to the other end of the shaft S. With this arrangement it will be apparent that the adjustor drive and indicator mechanism just described above is adapted to be mounted at either end of the shaft S and the different sets of indicia on the dial D will provide the same visual indication of angular adjustment of the shaft S notwithstanding the fact that, as viewed from one end of the shaft S the dial would rotate in a clockwise direction, while as viewed from the other end of the shaft S the dial would move in a counterclockwise direction during the course of effecting adjustment of the shaft S in the same sense.

In order that the indicia on the dial D may be better visually observed, it is preferred that the housing section 2 be provided with a sight opening 14 containing a magnifying lens 15 so that the respective indicia may be visualized in large scale.

In alignment with the bushing 11 and with the pinion 10 and pinion drive shaft 13, the housing section 2 is provided with an opening 16 in an internally supported flange 17 adapted to receive a boss 18 formed on a wall 19 of the case section 20 of the reduction gear mechanism R referred to above. The support section 17 and the boss 18 preferably complementally interfit and means are provided for securing the same against separation as well as against relative angular movement. In the illustrative embodiment separation of the reduction gear case section 20 from the housing section 2 is prevented by means of a pair of screw members 21, 21 respectively having reduced ends 22, 22 which extend into grooves 23, 23 formed in the boss 18. In addition, in order to prevent angular movement between the case section 20 of the reduction gear mechanism and the housing section 2, the boss preferably has a laterally projecting portion 24.

An end of the pinion shaft 13 is provided with a reduced portion 25 on which is mounted a drive gear 26, this reduced end 25 being rotatably supported in a bushing 27 in a case section 28 suitably secured to the case section 20 of the reduction gear mechanism as by fasteners 20', as seen in FIG. 2.

In laterally spaced relation to the shaft end 25 in the reduction gear case is a shaft 29 journalled at its opposite ends in bushings 30, 30 in the case sections 20 and 28 respectively; this shaft 29 supports a gear 31 which is in mesh with drive gear 26 for the pinion shaft 13 and also supports a larger gear 32 which is adapted to drive the shaft 29 to effect rotation of gear 31 and consequential rotation of gear 26, pinion 10, and large gear 9, which in turn will effect angular adjustment of the shaft S.

In order to effect omnidirectional rotation of gear 32 with consequential omnidirectional rotation of shaft S through the just mentioned gear train, a pair of similar motor assemblies generally denoted at M1 and M2 are provided. In the illustrative embodiment the motors are identical unidirectional shaded pole motors mounted in opposed or reverse relation so that rotation of gear 32 in one direction may be effected by motor M1 and rotation of gear 32 in the other direction may be effected by motor M2.

Each shaded pole motor comprises a stator 50 having a coil 51 and a rotor opening 52 in which is disposed the rotor 53. Rotor 53 is supported on a rotor shaft 54 reciprocably mounted in a bushing 55' supported by a transversely extended yoke 55. At the outer ends of the yoke 55 are fasteners 56 which, as best seen in FIG. 5, support the yoke 55 on the stator 50 and extend into the case of the reduction gear mechanism R so as to anchor and support the stator and rotor in proper cooperative relationship in respect of one another and on the case of the reduction gear mechanism R, with the rotor shaft 54 and rotor 53 free for reciprocal movement in the bushing 55'.

A splined end 56 on the rotor shaft 54 extends through a bushing 57 carried by the case section 20 as regards the rotor shaft of the motor M1 and carried by the case section 28 as regards the rotor shaft of the motor M2. Means are provided for normally biasing the rotor shaft 54 of each of the motors M1 and M2 in a direction to cause movement of the splined end 56 of the rotor shaft away from the gear 32. In the illustrative embodiment a coiled compression spring 58 is illustrated as surrounding the rotor shaft 54 and abutting at one end with the rotor 53 and at the other end with an opposing portion of the reduction gear case. When the motor is de-energized, the spring will be effective to cause movement of the rotor shaft from engagement with the gear 32. However, upon energization of a motor coil 51 the rotor 53 and shaft 54 will be moved axially against the bias of spring 58 to effect coengagement between the splined rotor shaft end 56 and the gear 32 while at the same time rotation of the rotor is effected by energization of the coil 51. Hence, splined rotor shaft ends 56 constitute clutch means drivingly engageable with the gear 32 which constitutes a member to be driven by the clutch means when engaged thereby while the motor shaft is rotating.

In the illustrative embodiment it will be assumed for purposes of description that each of the motors M is shaded so as to cause left hand rotation of the rotor as viewed from the yoke 55. Under such circumstances it will be recognized that by reversing the relationship of the motors M1 and M2 relative to one another and relative to the gear 32, when motor M1 engages and drives the gear 32, rotation of the latter in one sense will be effected, while opposite rotation of the gear 32 will be effected when the other motor is energized. Thus, selective energization of the motors M1 and M2 will cause omnidirectional adjustment of shaft S.

Energization of the motors M1 and M2 is effected by means of the circuitry diagrammatically illustrated in FIG. 4 in which a source of power is supplied through an input lead 60 which joins with a branch lead 61 connected to a contact 62 of a control switch mechanism for the motor M1, which switch mechanism is designated SM1. This switch mechanism includes a contact 63 which is normally connected with contact 62 by a switch element 64 loaded by a spring 65 into engagement with the contacts 62, 63. A second switch mechanism for the motor M2, which second switch mechanism is designated SM2 has a contact 65 and a second contact 66 which are normally closed by a switch element 67 biased into engagement with the contacts by spring 68. Interposed between contact 63 of switch SM1 and contact 65 of switch SM2 is a resistor 69 which will control the voltage applied to a conductor 70 leading from the switch contact 66 to motor M2 via a lead 71 as well as the voltage applied to motor M1 via a lead 72 so that the voltage applied to the respective motors M1 and M2 will be determined by the resistor 69 which may be selected to suit various requirements or, if desired, may be a variable resistor. Since the switches 64, 67 and 73, 74 and resistor 69 are series connected with the motors, the resistor is adapted to cause a holding voltage to be applied to the motors, namely, adequate voltage to prevent retrograde movement of gear 32 from a selected position of adjustment, without applying enough force to the gear 32 to cause further adjustment.

Interposed in the lead 72 to the motor M1 is a switch element 73 of switch mechanism SM1 and a switch element 74 of switch mechanism SM2, these switch elements normally completing the circuit through lead 72 under the influence of the previously described springs 65 and 68 respectively. It will now be understood that so long as switches SM1 and SM2 are in their normally closed condition thus far described with the flow of current to the motors M1 and M2 passing through resistor 69 and motor leads 71 and 72, both motor coils 51 will be energized and both of the rotor shafts 54 will be held in engagement with the gear 32 so that the latter will be effectively locked in place so long as the circuits through the motor leads 71 and 72 are maintained.

When it is desired to cause rotation of gear 32 in one direction or the other with consequential adjustment of shaft S in one direction or the other, one of the switches SM1 and SM2 will be operated to open the circuits to the motors at the respective switch contacts 62, 63 or 65, 66, thereby opening the circuit between the input lead 60 and both of the motor leads 71 and 72. At the same time, one or the other of the motors M1 and M2 will be energized through a conductor 75 having a branch 76 leading to a switch contact 77 of the switch mechanism SM1 at a branch 78 leading to a contact 79 of the switch mechanism SM2, the circuit to motor M1 being completed through a switch element 80, a contact 81, and a conductor 82 which joins motor input lead 72 and the circuit to motor M2 being completed through a switch element 83, a contact 84, and a conductor 85 leading to the input lead 71 of motor M2.

Since upon actuation of either of switches SM1 or SM2 only one of the motors is energized, the other motor rotor will be biased by the spring 58 away from the gear 32, while the motor rotor 54 of the energized motor will be moved into engagement with the gear 32 as the rotor revolves so that rotation of the gear 32 in a selected direction will be effected but the motor will not be subjected to a heavy starting load since revolution of the rotor commences while the rotor is moving axially.

Preferably, each of the motor input leads 71 and 72 is also provided with a limit switch respectively designated 90 and 91 which will be operated in response to movement of the gear 32 through a desired range of adjustment as, for example, when the adjustment has been effected so that the indicia of the dial D shows the dial to be at a location where either the 1 or the 9 is visible through the sight opening 14. In the practical application of the present adjustor mechanism to the variable speed mechanism of my above identified pending patent application, such limit would be at the extremes of the desired range of input to output drive ratio adjustment.

From the foregoing it will now be apparent that the present invention provides a simple and inexpensive electric motor operated adjustor mechanism which may be manually controlled by the switches SM1 and SM2 or which, if desired, may be automatically monitored.

While specific structural details have been shown and described, it should be understood that changes and alterations may be resorted to without departing from the spirit of the invention as defined in the appended claims:

I claim:
1. Adjustor mechanism for omnidirectionally adjusting the position of an adjustor member, comprising: a pair of shaded pole motors arranged in adjacent reverse relationship; each of said motors having a rotor and rotor shaft supported for reciprocation in one direction upon energization of said motor; means biasing said rotor in the other direction when said motor is de-energized; adjustor gear means disposed for selective driving engagement in opposite direction by the rotor shaft of the respective motors upon movement of said rotor shaft in said one direction; and circuit means for selectively energizing said motors.

2. Adjustor mechanism for omnidirectionally adjusting the position of an adjustor member, comprising: a pair of unidirectionally driven electric motors having rotor shafts disposed in opposing relation; each of said motors including means for supporting the respective rotor shafts for reciprocation toward and away from one another upon energization and de-energization of the motor; drivable means connectable to said adjustor member; the adjacent ends of said motor shafts having clutch means selectively engageable with said drivable means; and circuit means for selectively energizing said motors to cause said clutch means to be engaged with said drivable means and rotatively driven in one direction or the other by one motor or the other to effect driving of said drivable means.

3. An adjustor mechanism as defined in claim 1, wherein said circuit means also includes means for energizing both of said motors to hold said motor rotors and clutch means against rotation.

4. An adjustor mechanism as defined in claim 1, wherein said circuit means also includes means for normally simultaneously energizing both of said motors to lock said gear against rotation.

5. Adjustor mechanism for omnidirectionally adjusting the position of an adjustor member, comprising: a pair of unidirectionally driven electric motors having rotor shafts disposed in opposing relation; each of said motors including means for supporting the respective rotor shafts for reciprocation toward and away from one another upon energization and de-energization of the motor; drivable means connectable to said adjustor member; the adjacent ends of said rotor shafts having a gear clutch selectively engageable with said drivable means; circuit means for selectively energizing said motors to cause said gear clutch to be engaged with said drivable means and rotatively driven in one direction or the other by one motor or the other to effect driving of said drivable means; said circuit means including a power input and a lead from said input to each motor; switch means for each motor interposed in series between said input and the respective motor leads; means normally urging said switch means to closed position whereby both motors are normally energized; and means for energizing one of said motors upon opening of either of the aforesaid switch means.

6. Adjustor mechanism as defined in claim 5, wherein a resistor is interposed in the circuit leading to said motors through said series switch means for reducing the voltage applied to both motors when said switch means are closed, whereby both motor rotors are held aaginst rotation.

7. Adjustor mechanism as defined in claim 5, wherein limit switch means is interposed in each motor lead for limiting rotation of said drivable means.

8. Adjustor mechanism for omnidirectionally adjusting the position of an adjustor member, comprising: a supporting structure including a fixedly mounted gear case having a gear revolvable therein; a pair of unidirectional motors arranged in reverse relation and each having a stator mounted on said case and a rotor including a shaft extending into said case with said rotor shafts having their ends disposed in opposing relation within said case; clutch means in said case on the opposing ends of said rotor shafts; means supporting the rotors and shafts for reciprocation; means for urging said rotors and shaft ends away from said gear to effect disengagement of said clutch means and gear when the motor is de-energized; and circuit means for energizing said motors selectively.

9. Adjustor mechanism as defined in claim 8, wherein said support structure includes means driven by said gear for indicating the extent of adjustment of said adjustor member.

10. Adjustor mechanism as defined in claim 8, wherein said support structure includes a housing; means supporting said case on said housing; a gear revolvable in said housing; gear means drivingly interconnecting the gear in said case with the gear in said housing; means for connecting said gear in said housing to said adjustor member; and indicator means drively coupled with said gear in said housing to indicate the extent of adjustment of said latter gear.

11. Adjustor mechanism as defined in claim 10, wherein said gear means drivingly interconnecting said gear in said case with the gear in said housing includes a shaft extending through said means supporting said case on said housing.

12. Adjustor mechanism as defined in claim 10, wherein said means supporting said case on said housing includes a boss projecting from said case and a recess in said housing into which said boss projects, said gear means interconnecting said gear in said case with said gear in said housing including a shaft extending through said boss into said housing.

13. Adjustor mechanism as defined in claim 8, wherein said circuit means includes means for normally effecting energization of both motors simultaneously and operable to selectively effect energization of only one of said motors.

14. Electric motor driven mechanism, comprising: a gear support having a gear revolvable relative thereto; a pair of similar shaded pole electric motors mounted on said support in reverse relationship; each motor including a stator having a rotor opening therein; a rotor having a shaft; means supporting the rotor shaft of each motor for reciprocation to allow movement of said rotor axially in said rotor opening; the rotor shafts being axially aligned with one another and having opposing adjacent ends having clutch means engageable with said gear upon axial movement of the rotor shaft in one direction; means normally biasing the rotor shaft axially in the other direction; and circuit means for effecting selective energization of said motors.

15. Electric motor driven mechanism as defined in claim 14, wherein said circuit means includes switch means for each motor for normally causing said motors to be energized simultaneously, and operable to allow selective energization of one of said motors.

16. Electric motor driven mechanism as defined in claim 15, including a resistor normally in series with said switch means and motors, and additional circuit and switch means operable upon opening of said first mentioned switch means to cause energization of one of said motors.

References Cited

UNITED STATES PATENTS

| | | | |
|---|---|---|---|
| 2,491,842 | 12/1949 | Wells | 318—8 |
| 2,796,565 | 6/1957 | Walcott | 318—8 |
| 3,162,793 | 12/1964 | Mason | 318—8 |
| 3,164,729 | 1/1965 | Holzer | 318—540 X |

FOREIGN PATENTS

| | | |
|---|---|---|
| 255,502 | 11/1964 | Australia. |

ORIS L. RADER, *Primary Examiner.*

B. A. COOPER, *Assistant Examiner.*

UNITED STATES PATENT OFFICE
CERTIFICATE OF CORRECTION

Patent No. 3,409,813                                             November 5, 1968

Don Heyer

It is certified that error appears in the above identified patent and that said Letters Patent are hereby corrected as shown below:

Column 1, line 46, "now Pat. No. 3,374,106" should read -- now Pat. No. 3,287,988 --.

Signed and sealed this 17th day of March 1970.

(SEAL)
Attest:

Edward M. Fletcher, Jr.                              WILLIAM E. SCHUYLER, JR.
Attesting Officer                                                    Commissioner of Patents